United States Patent [19]

Dussaud

[11] 3,875,837

[45] Apr. 8, 1975

[54] PROCESS FOR THE PRODUCTION OF DIAPER PARTS

[75] Inventor: Jacques Dussaud, Derousseau Lille, France

[73] Assignee: Societe Anonyme dite: Consortium General Textile, Wasquehal (Nord), France

[22] Filed: July 30, 1973

[21] Appl. No.: 383,490

[30] Foreign Application Priority Data
July 31, 1972 France .................. 72.28137

[52] U.S. Cl. .............. 83/46; 83/47; 83/302; 83/408; 128/284
[51] Int. Cl. ................................. B26d 9/00
[58] Field of Search .......... 83/46, 408, 47, 302; 128/284

[56] References Cited
UNITED STATES PATENTS
| | | | |
|---|---|---|---|
| 1,172,067 | 2/1916 | Spiegel | 83/46 |
| 1,179,493 | 4/1916 | Ball | 83/46 X |
| 3,478,654 | 11/1969 | Willard | 83/408 X |
| 3,489,043 | 1/1970 | Deut | 83/408 X |

FOREIGN PATENTS OR APPLICATIONS
| | | | |
|---|---|---|---|
| 121,598 | 3/1971 | Norway | 128/284 |

Primary Examiner—Frank T. Yost
Attorney, Agent, or Firm—Robert E. Burns; Emmanuel J. Lobato; Bruce L. Adams

[57] ABSTRACT

A process for the manufacture of cut-out waterproof pieces of plastics material for use in the production of babies' diapers, the manufacturing apparatus used and the product thus obtained.

A moving web of plastics material is continuously formed, consisting of at least one flattened tubular sheath, the web being cut along a sinusoidal line into two lateral sections which are moved apart. The two sections are severed transversely at constant predetermined intervals into folded pieces of plastics which when opened out, resemble the shape of an hour glass.

3 Claims, 3 Drawing Figures

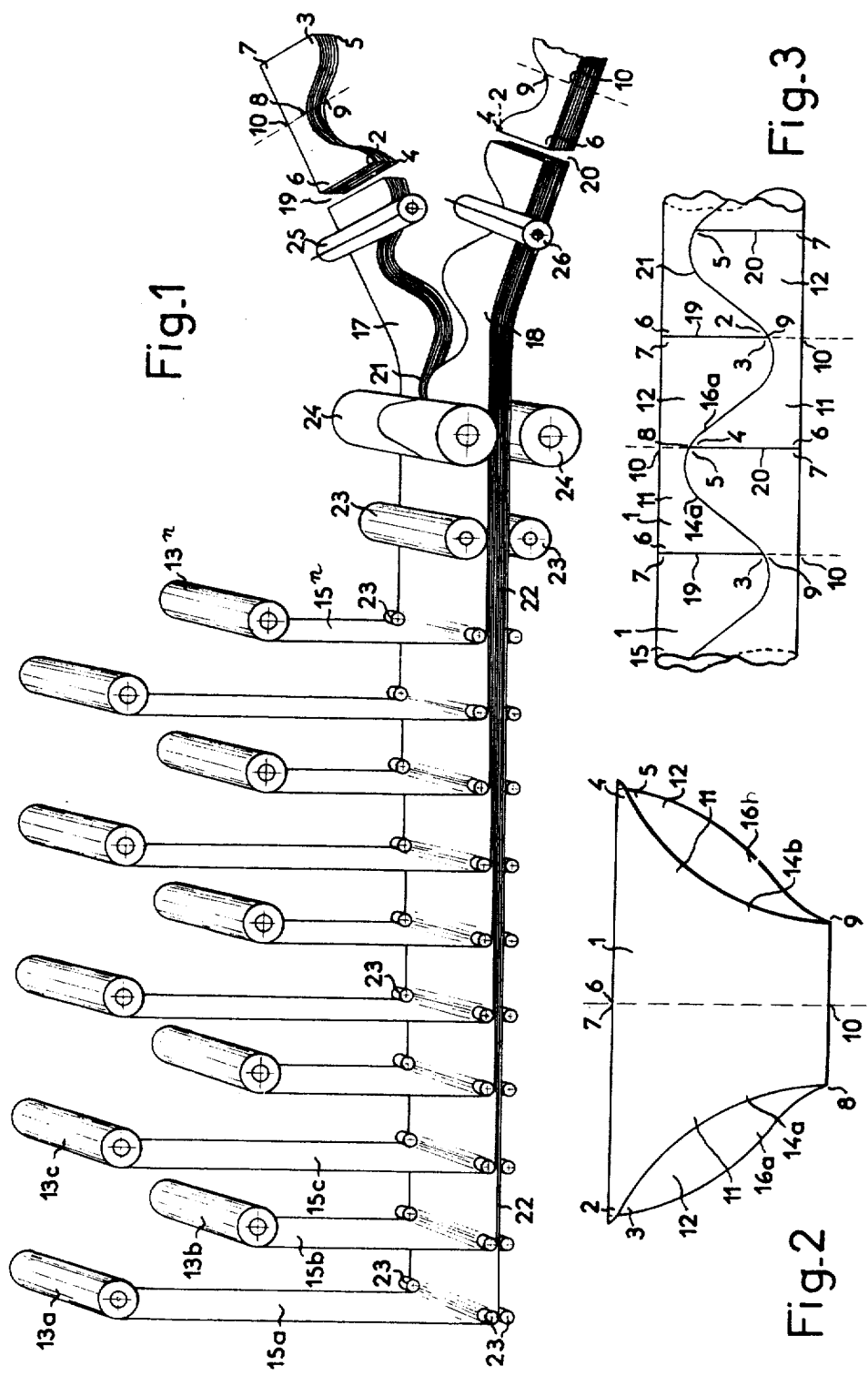

PROCESS FOR THE PRODUCTION OF DIAPER PARTS

BACKGROUND OF THE INVENTION

This invention relates to a process for the manufacture of waterproof parts of babies' diapers, to the manufacturing apparatus used and to the product thus obtained.

Processes are already known for the manufacture of diaper pieces cut out of a waterproof material, such as polyethylene, for use in producing a baby's diaper in the form of a pile of material sealed at the edges. These pieces are generally cut out of a flattened tubular sheath, but the shape elected for the cut-out pieces is such as to lead to considerable wastage. This useless surplus material then has to be detached from the cut-out piece and thrown away. The respective zones are provisionally utilized for sealing operations which solely serve to hold together, during the production of the diaper, the cut-out pieces forming a pile. This principle therefore not only leads to considerable waste of material but also involves additional labour in sealing and cutting out the pieces, these being tedious operations which increase the cost of the product.

These diaper pieces of known design also suffer from the drawback of having a rear part, protecting the baby's bottom, identical to the front part protecting its stomach. It is of great advantage to have a baby's diaper of which the rear part is considerably larger than the front part.

The diapers as hitherto produced are generally made up of two pieces cut out of a sheet of material or a tubular sheath. These two pieces are sealed together in order to form one sheet of the pile of sheets of which the diaper consists. This type of cut-out piece involves one more sealing operation for the production of the diaper than if the sheet of the pile consists of one piece only.

A general object of the present invention is to make it possible to obtain a cut-out piece of plastics material for a diaper without any loss in the form of wastage.

A further object of the invention is to obtain such a piece of which the part destined to cover the baby's bottom is larger than the part destined to cover the stomach, and the diaper produced therefrom thus has the same advantageous shape.

A primary object of the present invention is to provide a cut-out piece of plastics material for a diaper in such a way that the waterproof sheet of the pile constituting the diaper will consist of one single piece.

BRIEF SUMMARY OF THE INVENTION

According to the present invention there is provided a process for the production of diaper parts from flexible plastics material comprising forming a web of said material in the form of at least one flattened tubular sheath, cutting the web longitudinally into two sections along a sinusoidal line having an axis of symmetry at equal distances from the lateral folded edges of the or each sheath, and severing the two sections transversely at predetermined constant intervals.

Further according to the present invention there is provided apparatus for producing diaper parts from flexible plastics material comprising a plurality of rolls for supplying a corresponding number of flattened tubular sheaths of said material, rollers for guiding and forming said sheaths into one continuously moving web, means for cutting the moving web longitudinally into two sections along a sinusoidal line having an axis of symmetry at equal distances from the lateral edges of the web and means for severing each section transversely at predetermined constant intervals near the widest portions of the sections.

The invention further provides a diaper part produced by the process defined above and comprising a four sided piece of flexible plastics material resembling the shape of an hour glass, one pair of opposed sides being straight and mutually parallel, the other pair of sides being sinusoidal with the direction of the sine wave of one side being opposite to that of the other side, each side of said other pair constituting one full period of the sine wave, said other pair of sides being symmetrical about a longitudinal axis parallel to the periodic axis, said one full period being such as to provide the diaper part with a half of large area and a half of small area considered about an axis transverse to said longitudinal axis.

The cut-out piece thus obtained consists of a rear part provided with two projecting lateral portions and a front part provided with two lateral portions constituting hollows which reduced the size of the crutch portion of the diaper. The front and rear parts are asymmetrical, the rear part being far larger than the front part. This, as already mentioned, is a great advantage from the point of view of the comfort of the baby. The diaper part consists of one single piece.

BRIEF DESCRIPTION OF THE DRAWINGS

An embodiment of the present invention will now be described by way of example, with reference to the accompanying drawing, in which:

FIG. 1 is a schematic view, in perspective, of apparatus for producing diaper parts according to the present invention;

FIG. 2 is a plan view of a piece of plastics material cut out and folded into the shape which it assumes when it forms part of a diaper; and FIG. 3 is a schematic plan view, in perspective, of a sheath from which the pieces of plastics material are cut out.

DESCRIPTION OF PREFERRED EMBODIMENT

A diaper part made in accordance with the present invention, and consisting of a piece 1 of flexible plastics material resembling the shape of an hour glass, has four parts 2, 3, 4 and 5, to be tied, and by means of which it is attached to the baby's body by means of two knots, one on each side of the baby.

The diaper part is produced by folding each cut out piece 1 of plastics of which it consists along a line passing through points 8, 9, 10, to form a front part 11 and a rear part 12. The cut-out piece 1 also has a line of symmetry 6, 10, 7, subdividing both the front part 11 and the rear part 12 into two symmetrical portions, one on the left and one on the right.

The diaper part is also provided with an opening 2, 6, 4, 5, 7, 3 for the trunk of the baby's body and with two openings 2, 8, 3, and 4, 9, 5, respectively, for the legs.

It will be seen from FIG. 2 that the rear part 12 is larger than the front part 11. The rear part 12 is provided with two rear lateral portions 16a and 16b, which project, while the front part 11 has two front lateral portions 14a and 14b which form hollows.

The cut-out piece 1 is cut from an extruded flattened tubular sheath 15 without producing any wastage. A sheath 15 of this kind is shown in FIG. 3. As the tubular sheath is flattened it forms two lateral edges each constituting the line of symmetry 6, 10, 7 of each cut-out piece 1. The sheath 15, in the process according to the present invention, is cut longitudinally along one single sinusoidal line 21 of which the axis of symmetry is equidistant from the side edges of the sheath 15, constituting the line of symmetry 6, 10, 7 of the cut-out piece 1, as may be seen from FIGS. 1 and 3.

The resulting sinusoidal cut produces the edges of the openings 2, 8, 3 and 4, 9, 5, for the legs, as well as two corresponding side strips 17 and 18 placed symmetrically face to face.

Straight traverse cuts 19 and 20 are made in each of the side strips 17 and 18 and the cut-out pieces 1 are then opened out into their final blank form. These cuts form an upper edge 2, 6, 4 of the front part and a lower edge 5, 7, 3 of the rear part which form an assembly, after the cut-out piece 1 has been folded along the line 8, 9, 10 for the entry of the baby's body.

The transverse cuts 19 and 20 of each of the lateral strips 17 and 18 are independent of each other. They can be made at any desired suitable point along the sinusoidal line 21. They are at all events made in such a way that all the cut-out pieces 1 thus obtained are identical to one another, so that they can be used for mass production. The transverse cuts 19 and 20 are situated at a point along the sinusoidal line 21 near where the side strips 17 and 18 are widest. They are thus offset in relation to one another along the sheath 15. Alternately, there is a transverse cut 19 on the side strip 17 and a transverse cut 20 on the side strip 18, and so forth (FIG. 3). In order to obtain a front part 11 which will be smaller than the rear part 12, as already described, the transverse cuts 19 and 20 are not situated at the peaks of the sinusoidal curve, i.e., at the points where the lateral strips 17 and 18 are widest, but are systematically offset by a certain distance towards the front or towards the rear, in the direction in which the sheath 15 continues. The distance between any two successive transverse cuts, however, is equal to the pitch of the sine curve of the sinusoidal line 21. The folding line 8, 9, 10 is likewise offset in the same manner as the transverse cuts 19 and 20, so that the two upper edges of the rear and front parts can come together and form the continuous line for the part where the body enters.

The process according to the present invention therefore consists of the formation of a continuously moving, multi-layered web or pile 22 of at least one flattened tubular sheath 15 of a flexible plastics material. A sinusoidal line 21 is cut longitudinally along this pile and has its axis of symmetry at an equal distance from the lateral edges of the sheath 15, constituting a line of symmetry 6, 10, 7 for the cut-out piece 1. This process thus produces two side sections or strips 17 and 18, which are parted by moving them obliquely towards respective external sides. Identical cut-out pieces 1 are then produced by means of transverse cuts 19 and 20 made in the sections 17 and 18 are predetermined constant intervals. These transverse cuts 19 and 20 are offset in relation to one another along the sheath 15, so that a transverse cut 19 in the side strip 17 is followed by a transverse cut 20 in the side strip 18 and so forth alternately. The transverse cuts 19 and 20 are situated near the point of maximum width in side strips 17 and 18, systematically offset, by a certain constant but optional distance, forwards or backwards from the said point, in the direction in which the sheath 15 proceeds.

The apparatus for the production of the cut-out pieces 1 according to the present invention and as shown in FIG. 1 consists of a series of rollers 13a, 13b, and so forth, from which sheaths 15 unroll in order to form a pile 22 and which are guided by guide rollers 23. The sinusoidal line 21 is cut in the pile 22 by a cutting device 24, which conveniently is a cylinder having a continuous peripheral sinusoidal blade. The two lateral strips 17 and 18 thus cut out are directed obliquely towards the lateral sides by known means, not shown in the drawing. Relief cutters 25 and 26, e.g. in the form of cylinders and suitably positioned in relation to the course taken by the lateral strips 17 and 18 and the points where these latter are widest, sever the cut-out pieces 1 by means of transverse cuts 19 and 20.

I claim:

1. A process for producing diaper elements from flexible plastic material comprising:

providing a continuous web of said material in the form of at least one flattened tubular sheath having fold lines forming parallel lateral edges of said web, cutting said web longitudinally along a sinusoidal line having an axis equidistant from the lateral edges of said web to form two continuous like parts of varying width, each having a rectilinear edge formed by a lateral edge of said web and a sinuous edge formed by said longitudinal cut, and cutting each of said parts transversely at predetermined constant intervals equal to the pitch of said sinusoidal lines to form approximately hour glass shape elements each having an axis of symmetry formed by said fold line of said sheath, said transverse cuts being on transverse lines located in proximity to the zones of maximum width of said continuous part but materially displaced longitudinally a constant distance relative to the crests of said sinusoidal line so that the two portions of each said element on opposite sides of a line across the narrowest part of said element are asymmetrical relative to one another, a first one of said portions having convex side edges and a second one of said portions having concave side edges, said first portion having greater average width and greater area than said second portion.

2. A process according to claim 1, in which said two parts formed by said longitudinal cut are moved apart laterally from one another prior to making said transverse cuts.

3. A process according to claim 1, in which said longitudinal cut is effected by continuously passing said web of material longitudinally between a cylindrical backing roller and a cooperating cylindrical roller having on its periphery a cutting edge which in developed view is sinusoidal.

* * * * *